(12) United States Patent
Eberling-Fux et al.

(10) Patent No.: US 10,882,795 B2
(45) Date of Patent: Jan. 5, 2021

(54) PROCESS FOR MANUFACTURING A COMPOSITE PART

(71) Applicants: SAFRAN CERAMICS, Le Haillan (FR); ARIANEGROUP SAS, Paris (FR)

(72) Inventors: Nicolas Eberling-Fux, Moissy-Cramayel (FR); Eric Bouillon, Moissy-Cramayel (FR); Guy Jacob, Moissy-Cramayel (FR); Eddy Goullianne, Moissy-Cramayel (FR)

(73) Assignees: SAFRAN CERAMICS, Le Haillan (FR); ARIANEGROUP SAS, Paris (FR)

( * ) Notice: Subject to any disclaimer, the term of this patent is extended or adjusted under 35 U.S.C. 154(b) by 0 days.

(21) Appl. No.: 16/621,924

(22) PCT Filed: Jun. 13, 2018

(86) PCT No.: PCT/FR2018/051384
§ 371 (c)(1),
(2) Date: Dec. 12, 2019

(87) PCT Pub. No.: WO2018/229428
PCT Pub. Date: Dec. 20, 2018

(65) Prior Publication Data
US 2020/0131090 A1 Apr. 30, 2020

(30) Foreign Application Priority Data
Jun. 13, 2017 (FR) .................... 17 00619

(51) Int. Cl.
*C04B 35/571* (2006.01)
*C04B 35/628* (2006.01)
(Continued)

(52) U.S. Cl.
CPC ...... *C04B 35/571* (2013.01); *C04B 35/62863* (2013.01); *C04B 35/62871* (2013.01);
(Continued)

(58) Field of Classification Search
CPC ..... C04B 35/571; C04B 35/573; C04B 35/80; C04B 35/803; C04B 35/806;
(Continued)

(56) References Cited

U.S. PATENT DOCUMENTS 5,128,494 A * 7/1992 Blum ................ C04B 35/16
501/88
5,436,042 A * 7/1995 Lau .................. C04B 35/80
264/28
(Continued)

FOREIGN PATENT DOCUMENTS

CN 105951301 A 9/2016
FR 2 686 874 A1 8/1993
(Continued)

OTHER PUBLICATIONS

International Search Report as issued in International Patent Application No. PCT/FR2018/051384, dated Sep. 19, 2018.
(Continued)

*Primary Examiner* — Alex B Efta
(74) *Attorney, Agent, or Firm* — Pillsbury Winthrop Shaw Pittman LLP

(57) ABSTRACT

A process for manufacturing a composite part includes introducing an adhesion promoter into the pores of a fibrous preform formed by threads covered with a coating having —OH groups on its surface, the adhesion promoter including an electron-withdrawing group G1 that is reactive according to a reaction of substitution or of nucleophilic addition with the —OH groups, and a reactive group G2; grafting the adhesion promoter to the surface of the coating
(Continued)

by a reaction of substitution or nucleophilic addition of the —OH groups on the group G1; introducing a ceramic precursor resin into the pores of the fibrous preform; polymerizing the resin introduced and bonding the grafted adhesion promoter to the resin by chemical reaction between these two compounds at the level of the group G2, and forming a ceramic matrix phase in the pores of the fibrous preform by pyrolysis of the polymerized resin.

10 Claims, 5 Drawing Sheets

(51) Int. Cl.
*C04B 35/632* (2006.01)
*C04B 41/49* (2006.01)
*C04B 41/45* (2006.01)
*C04B 35/80* (2006.01)

(52) U.S. Cl.
CPC .. *C04B 35/62873* (2013.01); *C04B 35/62884* (2013.01); *C04B 35/632* (2013.01); *C04B 35/806* (2013.01); *C04B 41/4503* (2013.01); *C04B 41/457* (2013.01); *C04B 41/4539* (2013.01); *C04B 41/4554* (2013.01); *C04B 41/4558* (2013.01); *C04B 41/4584* (2013.01); *C04B 41/4922* (2013.01); *C04B 41/4955* (2013.01); *C04B 41/4961* (2013.01); *C04B 41/4983* (2013.01); *C04B 2235/483* (2013.01); *C04B 2235/5244* (2013.01); *C04B 2235/5248* (2013.01); *C04B 2235/5252* (2013.01)

(58) Field of Classification Search
CPC ............ C04B 41/4838; C04B 41/4853; C04B 41/4922; C04B 41/4955; C04B 41/4961; C04B 41/00; C04B 41/45; C04B 41/4503; C04B 41/4539; C04B 41/4552; C04B 41/4554; C04B 41/4558; C04B 41/457; C04B 41/4584; C04B 2235/483
See application file for complete search history.

(56) References Cited

U.S. PATENT DOCUMENTS

2017/0130014 A1\* 5/2017 Anyaogu ............... C09J 113/00
2018/0179697 A1\* 6/2018 Wang ....................... D01F 9/14

FOREIGN PATENT DOCUMENTS

| FR | 2 933 970 A1 | 1/2010 |
| FR | 2 953 885 A1 | 6/2011 |
| WO | WO 2006/136755 A2 | 12/2006 |

OTHER PUBLICATIONS

International Preliminary Report on Patentability and the Written Opinion of the International Searching Authority as issued in International Patent Application No. PCT/FR2018/051384, dated Dec. 17, 2019.
Office Action as issued in Chinese Patent Application No. 201880048801.1, dated Jul. 17, 2020.

\* cited by examiner

PROCESS FOR MANUFACTURING A COMPOSITE PART

CROSS-REFERENCE TO RELATED APPLICATIONS

This application is the U.S. National Stage of PCT/FR2018/051384, filed Jun. 13, 2018, which in turn claims priority to French patent application number 17 00619 filed Jun. 13, 2017. The content of these applications are incorporated herein by reference in their entireties.

The present invention relates to a process for manufacturing a composite part with a matrix at least partially of ceramic having improved mechanical properties.

BACKGROUND OF THE INVENTION

Composite parts with a matrix at least partially of ceramic may be obtained conventionally by a technique of polymer impregnation and pyrolysis (PIP).

In this technique, a liquid composition of a ceramic precursor polymer is introduced into the pores of a fibrous preform. The composition thus introduced is polymerized and then pyrolyzed in order to form the ceramic matrix phase. Various types of ceramic matrices may be formed by this method depending on the choice of precursor used. In particular, a polysilazane polymer may be used to obtain an SiCN matrix, a polycarbosilane polymer to obtain an SiC matrix or a polysiloxane polymer to obtain an SiCO matrix.

It is usual to repeat these cycles of infiltration and pyrolysis several times in succession in order to obtain the desired degree of porosity for the densified part, since transformation to ceramic by pyrolysis involves a volume shrinkage.

It is desirable to improve the mechanical properties displayed by composite parts whose matrix has been formed at least partly by a PIP technique.

SUBJECT MATTER AND SUMMARY OF THE INVENTION

According to a first aspect, the invention relates to a process for manufacturing a composite part comprising at least the following steps:
  introducing an adhesion promoter into the pores of a fibrous preform formed by threads covered with a coating having —OH groups on its surface, said adhesion promoter comprising an electron-withdrawing group G1 that is reactive according to a reaction of substitution or of nucleophilic addition with the —OH groups, and a reactive group G2 selected from: a hydroxyl function, an epoxide, a halogen atom, an amine function, a carbonyl function, a carbon-carbon double bond or a carbon-carbon triple bond,
  grafting the adhesion promoter to the surface of the coating by a reaction of substitution or nucleophilic addition of the —OH groups on the group G1, this grafting being carried out by a first heating of the fibrous preform into which the adhesion promoter has been introduced,
  introducing a ceramic precursor resin into the pores of the fibrous preform, after the step of grafting the adhesion promoter,
  polymerizing the resin introduced and bonding the adhesion promoter grafted to the resin by chemical reaction between these two compounds at the level of the group G2, said polymerizing and said bonding being carried out by a second heating of the fibrous preform into which the resin has been introduced, and
  forming a ceramic matrix phase in the pores of the fibrous preform by pyrolysis of the polymerized resin.

The inventors have conducted studies on parts having a matrix obtained by a PIP technique. These studies made it possible to identify that limitation of the mechanical properties of these parts arose from a problem of adhesion at the interfaces of the PIP matrix. The inventors have in fact found that there is loss of cohesion between the ceramic precursor in the polymerized state and a coating formed on the threads beforehand (see FIG. 1). In the test associated with FIG. 1, the coating was a layer of pyrolytic carbon (PyC) interphase covering the threads. For its part, FIG. 2 shows the existence of losses of cohesion between the matrix phase obtained after pyrolysis of the precursor and a coating of silicon carbide (SiC) formed on the threads beforehand. The existence of these losses of cohesion is reflected in suboptimal mechanical properties for the parts obtained.

The present invention was developed in order to solve this problem and thus employs an adhesion promoter for improving the adhesion between the PIP matrix phase and a coating formed on the threads beforehand. This previously formed coating may be of various kinds, as will be described hereunder. The adhesion promoter is able, owing to the group G1, to be grafted covalently to the underlying coating. The adhesion promoter is grafted at the level of the pendent —OH groups present on the surface of the coating, which are naturally present after exposure of the coating to the ambient air. Furthermore, the adhesion promoter is able, owing to the group G2, to react chemically with the resin. This reaction allows covalent bonding of the promoter to the ceramic precursor resin. The adhesion promoter thus constitutes a bonding intermediate between the resin, i.e. finally the PIP matrix phase, and the underlying coating, thus making it possible to improve the adhesion of this matrix phase to this coating. The use of the adhesion promoter proposed by the present invention thus contributes to improving the mechanical properties of the composite part obtained.

In an embodiment example, the process further comprises, before introduction of the promoter, a step of forming the coating on the threads by chemical vapor deposition or infiltration (CVD or CVI).

In this case, the coating may be an interphase or a preliminary matrix phase. In this example, use of the adhesion promoter improves the adhesion of the PIP matrix phase formed directly on this coating.

As a variant, the process further comprises, before introduction of the promoter, a step of forming the coating on the threads by introducing a precursor compound into the pores of the preform and pyrolysis of this precursor compound.

In this case, the coating constitutes a preliminary PIP matrix phase and the use of the adhesion promoter improves the adhesion between two blocks of PIP matrix formed in succession. It should be noted that when the matrix is formed from a plurality of blocks of PIP matrix, it is possible to employ the process described above in order to improve the adhesion between each of these blocks.

In an embodiment example, the material forming the surface of the coating is selected from: carbon, in particular pyrolytic carbon, carbon doped with boron, silicon carbide, boron nitride, boron nitride doped with silicon, or silicon nitride.

In an embodiment example, the group G1 is selected from: an epoxide, a carboxyl function, a halogen atom, a carbon-carbon double bond or a carbon-carbon triple bond.

In an embodiment example, the group G2 is selected from: a hydroxyl function, an amine function or a carbon-carbon double bond.

In an embodiment example, in the monomeric state the adhesion promoter has the following general formula: G1-E-G2, where E denotes a carbon chain comprising between 1 and 10 carbon atoms or a silane, siloxane, silazane or carbosilane chain comprising between 1 and 10 silicon atoms.

For example, E may be an aliphatic or aromatic carbon chain. E may be a linear or branched chain. In the monomeric state, the promoter may have a single group G2 or several groups G2.

In particular, E denotes a carbon chain comprising between 1 and 5 carbon atoms. As a variant, E denotes a silane, siloxane, silazane or carbosilane chain comprising between 1 and 5 silicon atoms.

In particular, the adhesion promoter is a halosilane.

In an embodiment example, the resin is selected from: polysiloxane resins, polysilazane resins, polycarbosiloxane resins, polycarbosilane resins, and mixtures of said resins.

BRIEF DESCRIPTION OF THE DRAWINGS

Other features and advantages of the invention will become clearer from the following nonlimiting description, referring to the appended drawings, where.

DETAILED DESCRIPTION OF EMBODIMENTS

Figure 1:
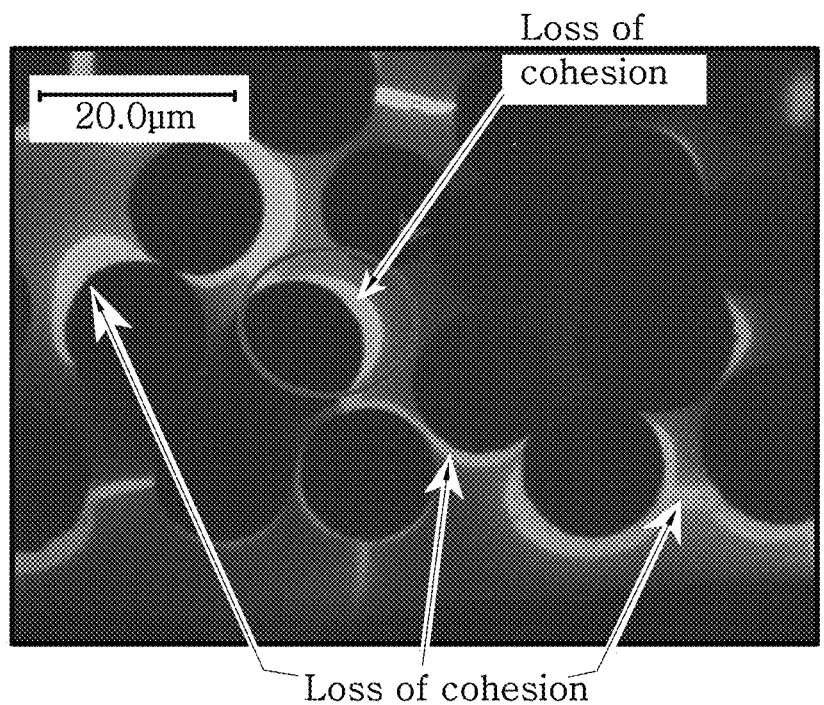
FIG. 1 is a photograph showing the existence of losses of cohesion between a ceramic precursor in the polymerized state and a coating of PyC formed on threads (not according to the invention)
Figure 2:
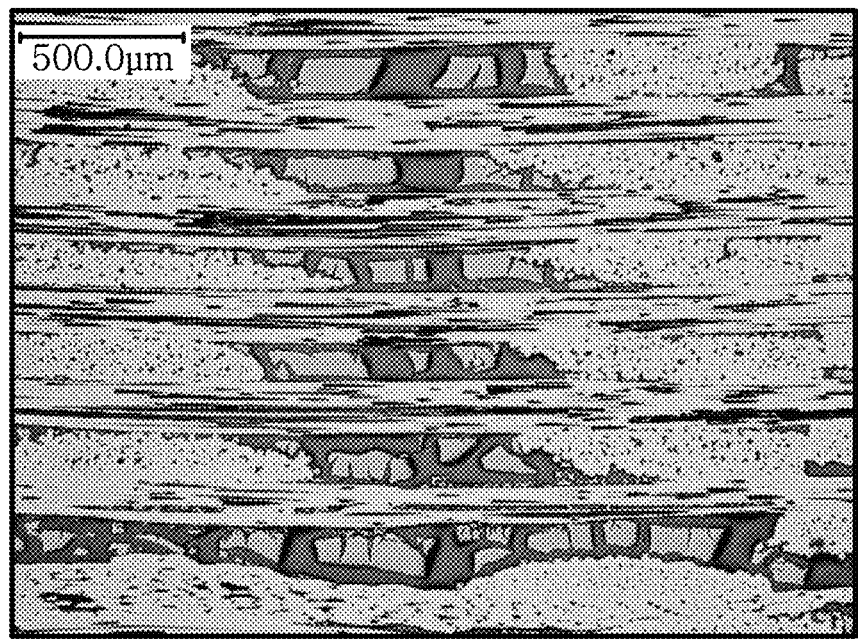
FIG. 2 is a photograph showing the existence of losses of cohesion between a PIP matrix phase and a coating of SiC formed on threads (not according to the invention)

Firstly, a fibrous preform formed from refractory threads, such as ceramic or carbon threads, is formed.

The preform may be formed for example from threads of silicon carbide supplied by the Japanese company NGS under the reference "Nicalon", "Hi-Nicalon" or "Hi-Nicalon Type S". The carbon threads usable for forming this preform are, for example, supplied under the name Torayca T300 3K by the company Toray.

The fibrous preform is obtained from at least one textile operation. The fibrous preform is intended to constitute the fibrous reinforcement of the part to be obtained. The fibrous preform may, in particular, be obtained by multilayer or three-dimensional weaving.

"Three-dimensional weaving" or "3D weaving" is to be understood as a manner of weaving whereby certain at least some warp yarns join weft yarns on several weft layers. A reversal of the roles between warp and weft is possible in the present text and is to be regarded as also covered by the claims.

The fibrous preform may, for example, have a multi-satin weave, i.e. be a fabric obtained by three-dimensional weaving with several layers of weft yarns where the basic weave of each layer is equivalent to a weave of the conventional satin type but with certain points of the weave that join the layers of weft yarns together. As a variant, the fibrous preform may have an interlock weave. "Interlock weave or fabric" is to be understood as a weave in 3D weaving where each layer of warp yarns joins several layers of weft yarns with all the yarns of the same warp column having the same movement in the plane of the weave. Various types of multilayer weaving usable for forming the fibrous preform are described in document WO 2006/136755.

It is also possible to form fibrous textures first, such as two-dimensional fabrics or unidirectional layers, and obtain the fibrous preform by drape forming said fibrous textures on a mold. These textures may optionally be joined together for example by stitching or implanting threads to form the fibrous preform.

The coating is then formed on the threads of the preform. This coating may be an interphase or may comprise one or more matrix phases partially densifying the fibrous preform. The coating may be of carbon, in particular of PyC, of carbon doped with boron (BC, with boron in an atomic proportion between 5% and 20%, the remainder being carbon) or of ceramic material, such as silicon carbide, boron nitride (BN), boron nitride doped with silicon (BN(Si), with silicon in a proportion by weight between 5% and 40%, the remainder being boron nitride) or silicon nitride ($Si_3N_4$).

The coating may thus be formed by a monolayer or multilayer interphase. In that case, the surface of the interphase has the —OH groups intended to allow grafting of the adhesion promoter. This interphase may comprise at least one layer of pyrolytic carbon, boron nitride, boron nitride doped with silicon or carbon doped with boron.

Here, the interphase has a function of relieving embrittlement of the composite material, which promotes deviation of any cracks reaching the interphase after being propagated in the matrix, preventing or delaying breakage of the threads by said cracks.

The thickness of the interphase may be between 10 nm and 1000 nm, and for example between 10 nm and 100 nm. The interphase may be formed on the threads of the preform by CVI.

As a variant, the interphase could be formed by chemical vapor deposition on the threads prior to formation of the preform, then forming this preform starting from the threads thus coated.

As a variant, the coating may comprise at least one preliminary matrix phase and optionally an interphase interposed between said at least one preliminary matrix phase and the threads. In that case, the outer preliminary matrix phase, i.e. the farthest from the threads of the preform, has on its surface the —OH groups intended to allow grafting of the adhesion promoter.

The outer preliminary matrix phase may be formed by various methods known per se, such as CVI, infiltration of silicon in the molten state ("Melt-Infiltration" process) or by a PIP technique. It should therefore be noted that, in the latter case, the adhesion promoter makes it possible to improve the adhesion between two successive blocks of PIP matrix. The outer preliminary matrix phase may be ceramic or of carbon. The outer preliminary matrix phase may be of carbon, or of PyC, silicon carbide, boron nitride or silicon nitride.

Of course, the fibrous preform remains porous, after formation of the coating, to allow formation of a PIP ceramic matrix phase joined to the coating via the adhesion promoter. This aspect will now be described with an example of a process according to the invention, illustrated in FIGS. 3A to 3D.

Figure 3A:
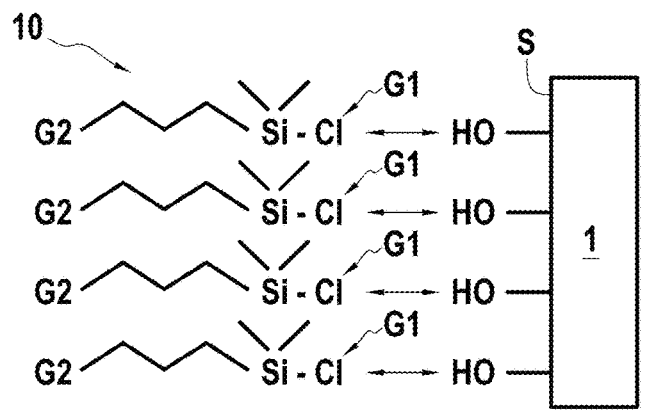
FIGS. 3A to 3D illustrate, schematically, different steps of an example of a process according to the invention.

After formation of the coating, the adhesion promoter 10 is introduced into the residual pores of the fibrous preform (see FIG. 3A). The adhesion promoter 10 may be introduced in the liquid state into the pores of the fibrous preform. The adhesion promoter 10 may be injected into the pores of the fibrous preform. The adhesion promoter 10 introduced is in contact with the surface S of the coating 1 bearing the —OH groups. This surface S corresponds to the external surface of the coating 1, i.e. the surface farthest from the threads forming the preform.

In the example illustrated, in the monomeric state the promoter 10 has the following general formula: G1-E-G2. Here, the group G1 is a chlorine atom and the chain E is a carbosilane chain with one silicon atom. Here, the adhesion promoter 10 is a chlorosilane. Several variants are possible for the groups G1 and G2 and for the chain E, as stated above.

In the example illustrated, the promoter 10 was introduced in the monomeric state. However, we remain within the scope of the invention when the promoter 10 is introduced in the oligomeric state.

The group G1 allows grafting of the promoter 10 to the coating 1. The group G2 allows the promoter to be joined to the ceramic precursor resin, and therefore ultimately to the ceramic matrix phase obtained after pyrolysis.

A first heating is carried out in order to graft the promoter 10 on the surface S of the coating 1. This first heating makes it possible to activate a reaction of substitution or nucleophilic addition of the —OH groups of the surface S on the group G1 and thus achieve grafting of the promoter 10. In the example illustrated, grafting is achieved by a nucleophilic substitution reaction. After grafting, we obtain a promoter 20 grafted to the surface S of the coating 1 through formation of a covalent bond between the oxygen of the —OH groups and the abovementioned chain E (see FIG. 3B).

An approximately constant temperature (±2° C.) may be imposed during the first heating. Based on his general knowledge, a person skilled in the art will be able to determine the temperature value to be imposed during the first heating as a function of the adhesion promoter. The temperature imposed during the first heating may typically be between 30° C. and 60° C.

Figure 3B:
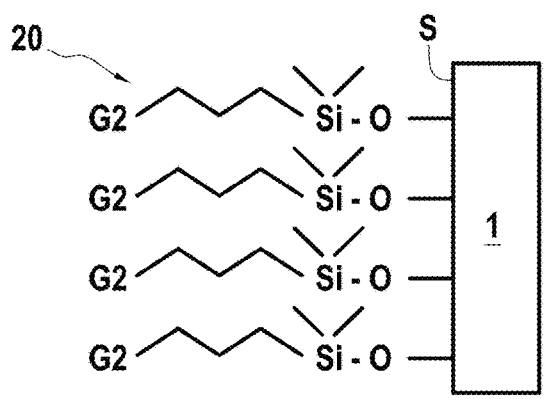

After grafting, the grafted promoter 20 still has at least one pendent group G2 intended to react with the ceramic precursor resin (see FIG. 3B).

Figure 3C:
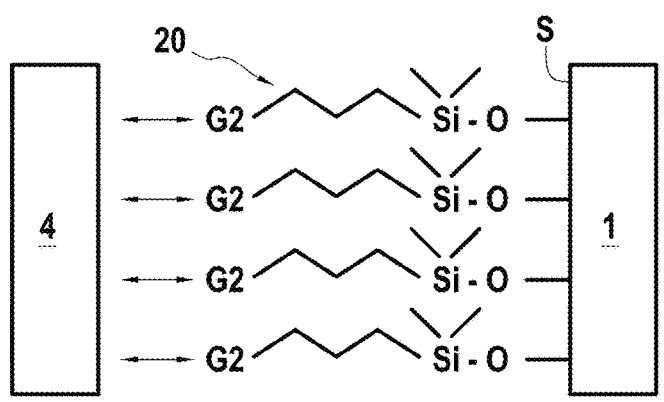

Once the adhesion promoter 20 has been grafted, a ceramic precursor resin 4 is introduced into the pores of the fibrous preform (see FIG. 3C). The resin 4 introduced is in contact with the grafted promoter 20. The resin 4 may be introduced in the liquid state into the pores of the fibrous preform. The resin 4 may be injected into the pores of the fibrous preform. This resin 4 is known per se, and may be selected from: polysiloxane resins, polysilazane resins, polycarbosiloxane resins, polycarbosilane resins, and mixtures of said resins.

Once the resin 4 is introduced, it will bind covalently to the grafted promoter 20. This bond is produced by a chemical reaction between the group G2 of the grafted promoter 20 and a reactive function carried by the resin 4. As an example, the reactive function of the resin 4 may be selected from the following groups: —OH, Si—H or a carbon-carbon double bond.

Advantageously, the group G2 is selected from: —OH, —NH$_2$ or a carbon-carbon double bond. The choice of said groups G2 allows further improvement of the adhesion of the resin 4 to the grafted promoter 20. It is advantageous for G2 to be —OH when the resin is a polysiloxane resin. It is advantageous for G2 to be —NH$_2$ when the resin is a polysilazane resin. It is advantageous for G2 to be a carbon-carbon double bond when the resin is a polysiloxane, polysilazane or polycarbosilane resin.

As an example, it is possible to use a polycarbosilane resin marketed under the reference "SMP-10" by Starfire® Systems. Such a resin has Si—H functions and carbon-carbon double bonds able to react with the groups G2.

As an example, it is possible to use a polysilazane resin marketed under the reference "HTT1800" or "PSZ 20" by Clariant. Such resins have Si—H functions and carbon-carbon double bonds able to react with the groups G2.

As an example, it is possible to use a polysiloxane resin marketed under the reference "H62C" by Wacker. Such a resin has Si—H functions and carbon-carbon double bonds able to react with the groups G2.

As an example, it is possible to use a polysiloxane resin marketed under the reference "MK" or "MS100" by Wacker. Such resins have Si—H functions and —OH groups able to react with the groups G2.

As an example, it is possible to use a polycarbosiloxane resin marketed under the reference "SPR212" or "SPR036" by Starfire® Systems. Such resins have Si—H functions and carbon-carbon double bonds able to react with the groups G2.

The bonding of the adhesion promoter 20 grafted to the resin 4 may be carried out by various chemical reactions, depending on the nature of the group G2 and of the reactive function carried by the resin 4.

As an example, when the resin bears an Si—H function and the group G2 is a carbon-carbon double bond, the reaction may be a hydrosilylation leading to an Si—C—C bond.

As an example, when the resin bears an Si—H function and the group G2 is —OH, the reaction may be a condensation leading to an Si—O—Si bond.

As an example, when the resin bears an Si—H function and the group G2 is —NH$_2$, the reaction may be a condensation (transamination) leading to an Si—N—Si bond.

As an example, when the resin bears a carbon-carbon double bond and the group G2 is a carbon-carbon double bond, the reaction may be an addition leading to a C—C—C—C bond.

Bonding of the resin 4 to the grafted promoter 20 is carried out by performing a second heating. The second heating makes it possible both to polymerize the resin 4 and activate the reaction of bonding of the latter to the grafted promoter 20. Based on his general knowledge, a person skilled in the art will be able to determine the temperature value to be imposed during the second heating as a function of the resin and the grafted promoter 20 used. A temperature between 90° C. and 250° C. may typically be imposed during the second heating.

Figure 3D:
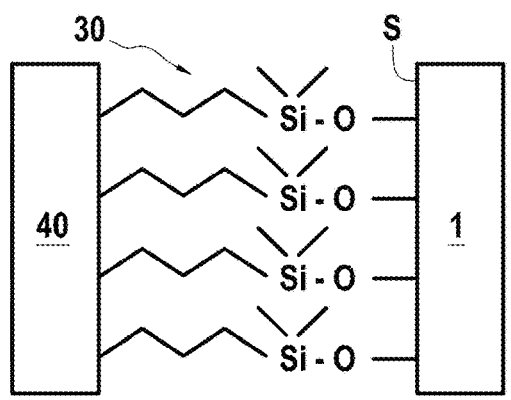

FIG. 3D shows the bonding of the polymerized resin 40 to the grafted promoter 30. In this configuration, the promoter 30 forms a linkage between the polymerized resin 40 and the coating 1. The polymerized resin 40 is then pyrolyzed in order to form a ceramic matrix phase in the pores of the fibrous preform.

It should be noted that formation of the matrix of the part may involve the execution of several PIP cycles of introduction and pyrolysis of a ceramic precursor resin. In that case, an adhesion promoter may be grafted to a block of matrix obtained by PIP before each new introduction of the ceramic precursor resin. In this case, the adhesion promoter joins together the various blocks of PIP matrix, in order to improve the adhesion of these blocks with one another.

Once obtained, the part thus manufactured may be a part for an aeronautical or aerospace application. The part may be a part for the hot section of a gas turbine of an aeronautical or aerospace engine or of an industrial turbine. The part may be a part of a turbine engine. The part may constitute at least a portion of a distributor, at least a portion of a nozzle or of a thermal protection coating, a wall of a combustion chamber, a sector of a turbine ring or a blade of a turbine engine.

EXAMPLES

Example 1

An adhesion promoter was introduced into the pores of a fibrous preform of SiC threads predensified with an SiC preliminary matrix phase. The adhesion promoter used was acetoxyethyldimethylchlorosilane.

The adhesion promoter thus introduced was grafted to the surface of the SiC preliminary matrix phase by performing a first heating. The corresponding chemical reaction was carried out in a heat-controlled reactor in cyclohexane for 24 hours, setting a temperature of 40° C. during the first heating. A nitrogen flow rate of 0.6 L/h was set during this reaction.

Figure 4:
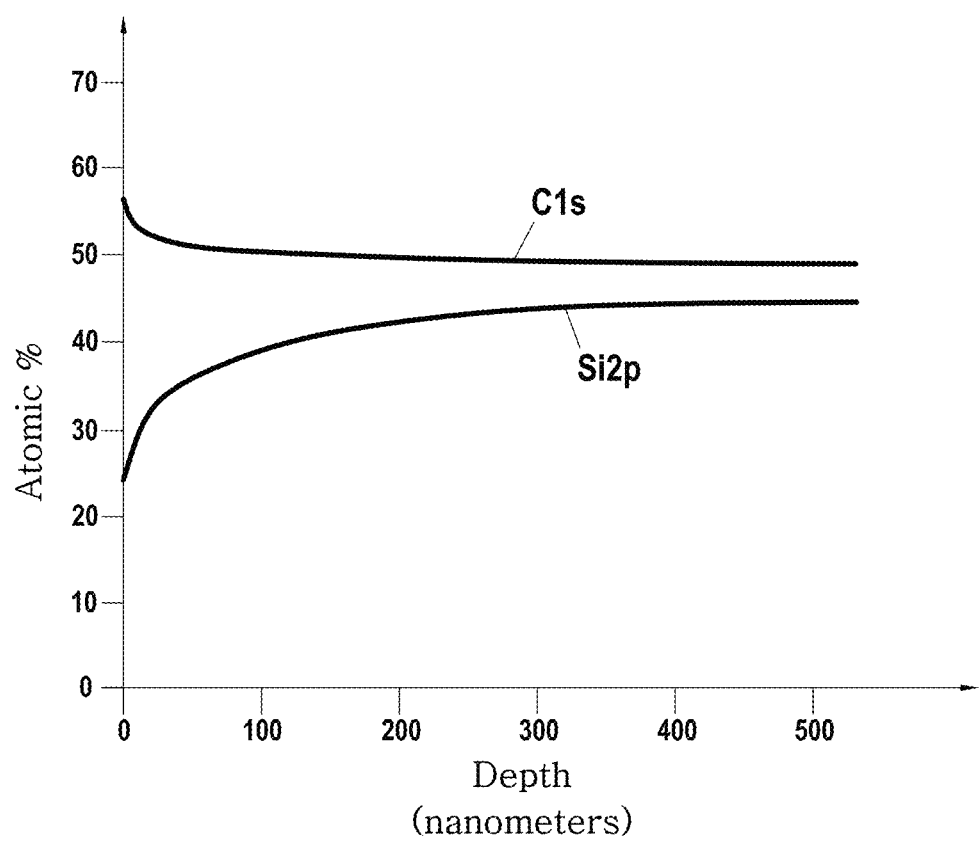
FIG. 4 shows a result of measurement by analysis by X-ray photoelectron spectrometry performed after grafting an adhesion promoter, in the context of a first example of a process according to the invention.

The grafting of the adhesion promoter was verified by analysis by X-ray photoelectron spectrometry ("XPS" analysis). The result obtained is presented in FIG. 4 and shows the presence of an organosilicon species, corresponding to the grafted promoter, on the surface of the SiC preliminary matrix phase.

Once the promoter had been grafted, a polysiloxane resin marketed under the reference "MK" by Wacker was introduced into the pores of the fibrous preform.

Figure 5A:
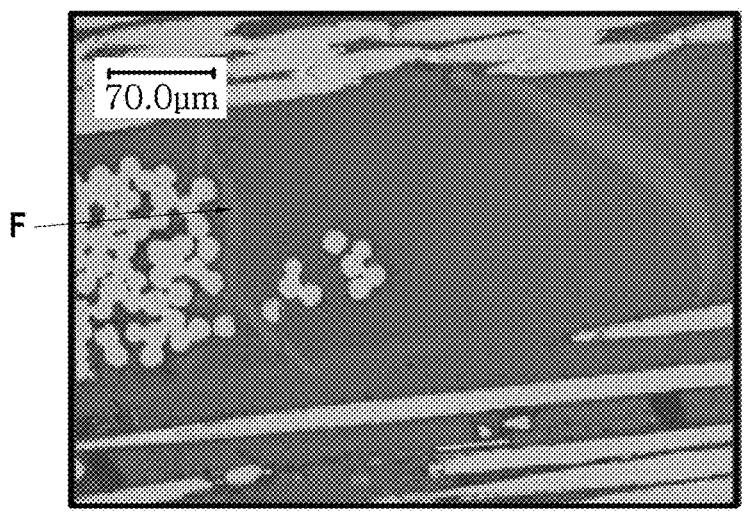
FIGS. 5A to 5C are photographs of the composite material obtained in the first example of a process according to the invention.

A second heating at 250° C. was then carried out in order to polymerize the resin introduced and bind it to the grafted adhesion promoter. FIG. 5A is a photograph of the material obtained after polymerization of the polysiloxane resin and before pyrolysis thereof. It is found that there are cracks "F" that are propagated preferentially within the polymer matrix rather than at the interface between the polymer matrix and the SiC preliminary matrix phase. This proves the existence of strong adhesion of this polymer matrix to the SiC preliminary matrix, and therefore to the fibrous reinforcement. This strong adhesion is due to the bond developed between the resin and the grafted promoter during the second heating.

Figure 5B:
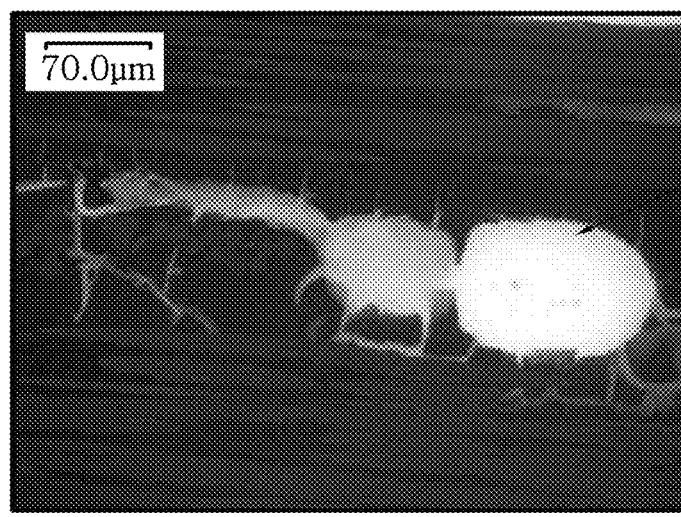
Figure 5C:
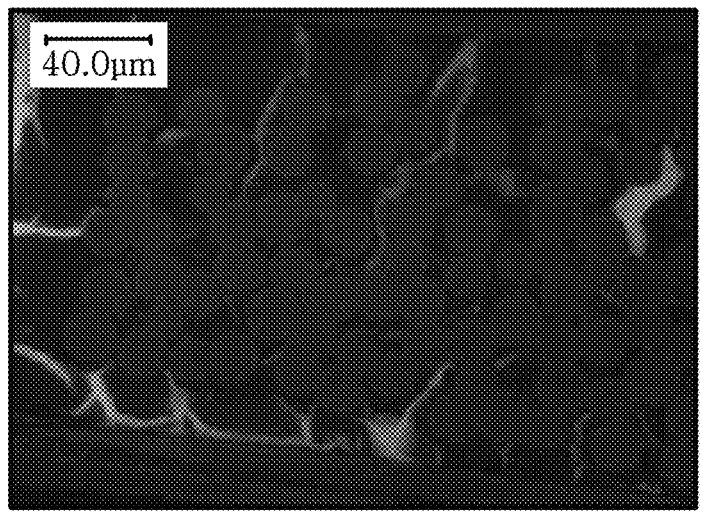

A ceramic matrix phase was then obtained by pyrolysis of the polysiloxane resin, by applying heat treatment at 900° C. FIGS. 5B and 5C are photographs of the material obtained after this pyrolysis. Once again it is found that there is preferential presence of cracks "F" within the matrix obtained by pyrolysis, rather than at the interface between the preliminary matrix phase and the matrix phase obtained by pyrolysis. This confirms good adhesion of the matrix phase obtained by pyrolysis to the coating and to the underlying fibrous reinforcement.

Example 2

An adhesion promoter was introduced into the pores of a fibrous preform of SiC threads predensified with an SiC preliminary matrix phase. The adhesion promoter used was allyldimethylchlorosilane.

The adhesion promoter thus introduced was grafted to the surface of the SiC preliminary matrix phase by carrying out a first heating. The corresponding chemical reaction was carried out in a heat-controlled reactor in cyclohexane for 24 hours, setting a temperature of 40° C. during the first heating. A nitrogen flow rate of 0.6 L/h was set during this reaction.

In the same way as for example 1, grafting of the adhesion promoter was confirmed by X-ray photoelectron spectrometry ("XPS" analysis).

Once the promoter had been grafted, a polysilazane resin marketed under the reference "PSZ 20" by Clariant was introduced into the pores of the fibrous preform.

Figure 6A:
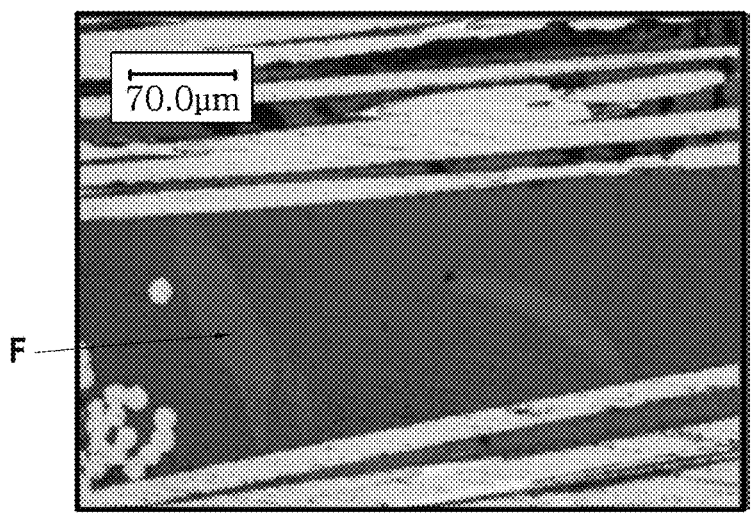
FIGS. 6A to 6C are photographs of the composite material obtained in the second example of a process according to the invention.

A second heating at 250° C. was then carried out in order to polymerize the resin introduced and bind it to the grafted adhesion promoter. FIG. 6A is a photograph of the material obtained after polymerization of the polysilazane resin and before pyrolysis thereof. As in example 1, the presence of cracks "F" preferentially within the polymer matrix is found, thus proving good adhesion of this polymer matrix.

Figure 6B:
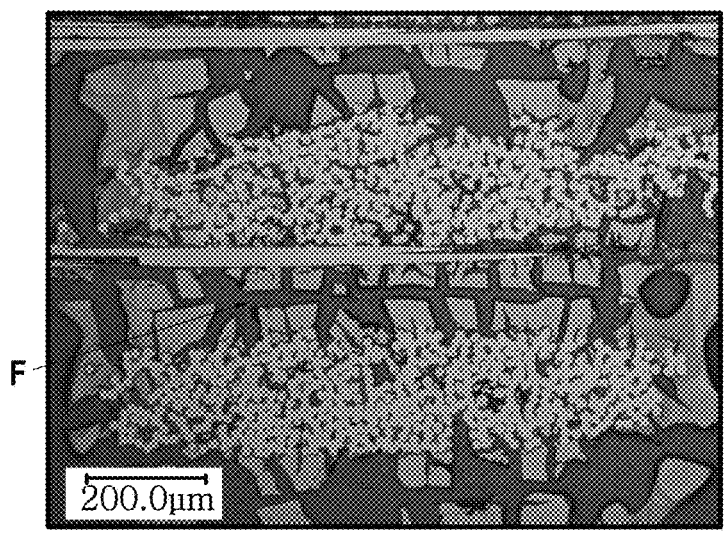
Figure 6C:
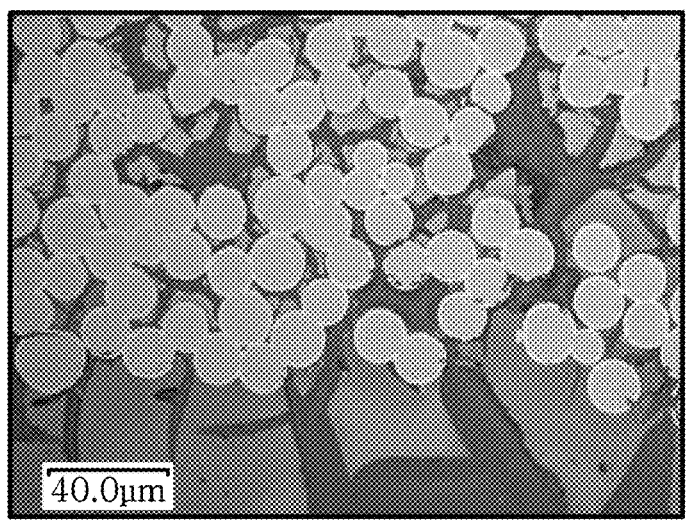

A ceramic matrix phase was then obtained by pyrolysis of the polysilazane resin, by applying heat treatment at 900° C. FIGS. 6B and 6C are photographs of the material obtained after this pyrolysis. Preferential presence of cracks "F" within the matrix obtained by pyrolysis is also found.

The expression "between . . . and . . . " is to be understood as including the limits of the range.

The invention claimed is:

1. A process for manufacturing a composite part comprising:
   introducing an adhesion promoter into pores of a fibrous preform formed by threads covered with a coating having —OH groups on its surface, the adhesion promoter comprising an electron-withdrawing group G1 that is reactive according to a reaction of substitution or of nucleophilic addition with the —OH groups, and a reactive group G2 selected from: a hydroxyl function, an epoxide, a halogen atom, an amine function, a carbonyl function, a carbon-carbon double bond or a carbon-carbon triple bond,
   grafting the adhesion promoter to the surface of the coating by a reaction of substitution or nucleophilic addition of the —OH groups on the group G1, this grafting being carried out by a first heating of the fibrous preform into which the adhesion promoter has been introduced,
   introducing a ceramic precursor resin into the pores of the fibrous preform, after the step of grafting the adhesion promoter,
   polymerizing the resin introduced and bonding the grafted adhesion promoter to the resin by chemical reaction between these two compounds at the level of the group G2, said polymerizing and said bonding being carried out by a second heating of the fibrous preform into which the resin has been introduced, and
   forming a ceramic matrix phase in the pores of the fibrous preform by pyrolysis of the polymerized resin.

2. The process as claimed in claim 1, further comprising, before introduction of the promoter, a step of forming the coating on the threads by chemical vapor deposition or infiltration.

3. The process as claimed in claim 1, further comprising, before introduction of the promoter, a step of forming the coating on the threads by introducing a precursor compound into the pores of the preform and pyrolysis of this precursor compound.

4. The process as claimed in claim 1, wherein the material forming the surface of the coating is selected from: carbon, carbon doped with boron, silicon carbide, boron nitride, boron nitride doped with silicon, or silicon nitride.

5. The process as claimed in claim 1, wherein the group G1 is selected from: an epoxide, a carboxyl function, a halogen atom, a carbon-carbon double bond or a carbon-carbon triple bond.

6. The process as claimed in claim 1, wherein the group G2 is selected from: a hydroxyl function, an amine function or a carbon-carbon double bond.

7. The process as claimed in claim 1, wherein, in a monomeric state, the adhesion promoter has the following general formula: G1-E-G2, where E denotes a carbon chain comprising between 1 and 10 carbon atoms or a silane, siloxane, silazane or carbosilane chain comprising between 1 and 10 silicon atoms.

8. The process as claimed in claim 7, wherein E denotes a carbon chain comprising between 1 and 5 carbon atoms, or in which E denotes a silane, siloxane, silazane or carbosilane chain comprising between 1 and 5 silicon atoms.

9. The process as claimed in claim 7, wherein the adhesion promoter is a halosilane.

10. The process as claimed in claim 1, wherein the resin is selected from: polysiloxane resins, polysilazane resins, polycarbosiloxane resins, polycarbosilane resins, and mixtures of such resins.

* * * * *